United States Patent
Seo et al.

(10) Patent No.: US 11,429,092 B2
(45) Date of Patent: Aug. 30, 2022

(54) ASSET MANAGEMENT METHOD FOR POWER EQUIPMENT

(71) Applicant: Hyosung Heavy Industries Corporation, Seoul (KR)

(72) Inventors: Hwang Dong Seo, Gimhae-si (KR); Eun Tae Lyu, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 419 days.

(21) Appl. No.: 16/473,074

(22) PCT Filed: Dec. 15, 2017

(86) PCT No.: PCT/KR2017/014871
§ 371 (c)(1),
(2) Date: Jun. 24, 2019

(87) PCT Pub. No.: WO2018/124571
PCT Pub. Date: Jul. 5, 2018

(65) Prior Publication Data
US 2019/0354095 A1    Nov. 21, 2019

(30) Foreign Application Priority Data
Dec. 28, 2016 (KR) .......................... 10-2016-0181585

(51) Int. Cl.
*G05B 23/02* (2006.01)
*G06Q 50/06* (2012.01)
(Continued)

(52) U.S. Cl.
CPC ............. *G05B 23/02* (2013.01); *G06Q 10/06* (2013.01); *G06Q 30/02* (2013.01); *G06Q 50/06* (2013.01); *G06Q 50/10* (2013.01)

(58) Field of Classification Search
CPC ................ G05B 23/02; G05B 23/0243; G05B 23/0283; G06Q 10/06; G06Q 10/0637;
(Continued)

(56) References Cited

U.S. PATENT DOCUMENTS

2015/0363750 A1    12/2015 Svensson et al.

FOREIGN PATENT DOCUMENTS

FR            3023390 A1    1/2016
KR    10-2009-0001148 A    1/2009
(Continued)

OTHER PUBLICATIONS

Goyal et al., Asset Health Management Using Predictive and Prescriptive Analytics for the Electric Power Grid, Jan./Feb. 2016, IBM J. Res. & Dev., vol. 60, No. 1, pp. 4:1-4:14 (Year: 2016).*

*Primary Examiner* — Toan M Le
(74) *Attorney, Agent, or Firm* — Novick, Kim & Lee, PLLC; Jae Youn Kim (57) ABSTRACT

An asset management method for power equipment in accordance with the present invention comprises steps of generating integrity of each sub-device of the power equipment by using state data and real-time monitoring data of the each sub-device; compensating a reference reliability model by the each sub-device and generating a unique reliability model by the each sub-device by comparing reliability of the reference reliability model by the each sub-device and the integrity by the each sub-device; calculating reliability of the power equipment by applying a system relationship model between the power equipment and the each sub-device to which specific weight and failure rate are reflected; deriving, and calculating an estimate of, a maintenance scenario by the each sub-device; and updating the reliability model for the power equipment while updating the unique reliability (Continued)

model by the each sub-device by a predetermined priority and according to execution of maintenance.

5 Claims, 7 Drawing Sheets

(51) Int. Cl.
*G06Q 10/06* (2012.01)
*G06Q 30/02* (2012.01)
*G06Q 50/10* (2012.01)

(58) Field of Classification Search
CPC .... G06Q 30/02; G06Q 30/0283; G06Q 50/06; G06Q 50/10
See application file for complete search history.

(56) References Cited

FOREIGN PATENT DOCUMENTS

| | | |
|---|---|---|
| KR | 10-2011-0076451 A | 7/2011 |
| KR | 10-2012-0128504 A | 11/2012 |
| KR | 10-2013-0140237 A | 12/2013 |
| KR | 10-2016-0093119 A | 8/2016 |
| KR | 10-1683262 A | 12/2016 |

\* cited by examiner

ASSET MANAGEMENT METHOD FOR POWER EQUIPMENT

FIELD OF THE INVENTION

The present invention relates to an asset management method for power equipment and an apparatus for executing this; and more particularly to, the asset management method for power equipment being capable of deriving an optimized management plan by power equipment by integrity of each sub-device as part of the power equipment and the apparatus for executing this.

BACKGROUND OF THE INVENTION

Among power systems, a transmission system or a distribution system has a substation to raise or reduce output of a generator or voltage of the system. In addition to a transformer for raising or reducing voltage, the substation includes devices or systems for centralizing or distributing power, those for controlling tidal current, or those for protecting and controlling its devices.

For example, in a gas circuit breaker used for a gas insulated switchgear or GIS, a gas pressure sensor for detecting gas pressure change, current and voltage detectors, etc. are installed while a transformer has a thermometer, a pressure gauge, a liquid measuring sensor, a current detector, etc. as sensors for detecting its state.

Those sensors are connected to a protective system, a measuring system, a controller, and a devices-monitoring system through cables which transmit electronic signals. Again, the protective system, the measuring system, the controller, and the devices-monitoring system are connected to a superior substation-monitoring controller through cables which transmit the electronic signals.

The substation has very complicated equipment to stably supply electricity which monitors operational state of a variety of devices such as a circuit breaker installed in the substation and also provides a monitoring system to detect a failure symptom in advance to prevent such failure or recover in rapid response to any incurred failure.

As it is difficult to identify accurate states of elements of the substation, the need for optimized techniques for asset management such as element replacement cycle, and maintenance plan is raised and a plan for solving such requirements is needed.

DETAILED EXPLANATION OF THE INVENTION

Objects of the Invention

An object of present invention is to provide an asset management method for power equipment of deriving an optimal reliability model of the power equipment by additionally compensating the reliability model of the power equipment while being allowed to derive the optimal reliability model of the power equipment by sub-device through a pre-crated process of compensating the reliability model of the power equipment and an apparatus for performing this.

The other object of the present invention is to provide an asset management method of power equipment for satisfying needs of customers for a request of a replacement cycle, a maintenance plan, and an asset management technique of the power equipment and its sub-devices and an apparatus for performing this.

The objects of the present invention are not limited to the aforementioned objects and other objects which have not been mentioned could be clearly understood by those skilled in the art from description below.

Means of Solving the Problem

An asset management method for power equipment in accordance with the present invention comprises steps of: generating integrity of each sub-device of the power equipment by using state data and real-time monitoring data of the each sub-device; compensating a reference reliability model by the each sub-device and generating a unique reliability model by the each sub-device by comparing reliability of the reference reliability model by the each sub-device and the integrity by the each sub-device; calculating reliability of the power equipment by applying a system relationship model between the power equipment and the each sub-device to which specific weight and failure rate are reflected; deriving, and calculating an estimate of, a maintenance scenario by the each sub-device; and updating the reliability model for the power equipment while updating the unique reliability model by the each sub-device by a predetermined priority and according to execution of maintenance.

Herein, the reference reliability model by sub-device may be generated based on at least one of data on installation and checkup history, data on analyses of obsolete and removed items, and data on accelerated life tests by the sub-device.

Besides, the step of generating integrity of each sub-device of the power equipment by using state data and real-time monitoring data of the each sub-device may include a step of generating integrity by the sub-device by utilizing online, and offline monitoring state data and remote monitoring data by the each sub-device, wherein the offline monitoring state data include at least one of data on installation history, checkup history, failure history, operating environment, and operating history by the sub-device.

In addition, the step of generating integrity of each sub-device of the power equipment by using state data and real-time monitoring data of the each sub-device may include a step of generating total score of, and actions against, technical risks depending on an operating environment, insulation deterioration, an electrical risk, a thermal risk, a chemical risk, a mechanical risk, airtightness performance, insulation performance, interrupting performance, and current-carrying performance by the each sub-device.

Also, the step of compensating a reference reliability model by the each sub-device and generating a unique reliability model by the each sub-device by comparing reliability of the reference reliability model by the each sub-device and integrity by the each sub-device may include a step of compensating the reference reliability model by the sub-device and calculating the reliability by applying the integrity by sub-device.

Moreover, the step of calculating reliability of the power equipment by applying a system relationship model between the power equipment and the each sub-device to which specific weight and failure rate are reflected may include a step of calculating failure rate of the power equipment by applying the specific weight and the failure rate to the each sub-device.

In addition, the step of deriving, and calculating an estimate of, a maintenance scenario by the each sub-device may include a step of deriving, and selecting an estimate of, a maintenance scenario by the each sub-device, including a maintenance strategy method, costs, and priority by the each sub-device, checkup cycle, estimated costs, checkup scheduling, and assumed maintenance effects thereby, and expected replacement time thereby depending on an output value for assessing reliability, an output value for technical assessment, and an output value for economic feasibility by the maintenance scenario.

Furthermore, the step of updating the reliability model for the power equipment while updating the unique reliability model by the each sub-device by a predetermined priority and according to execution of maintenance may include a step of selecting a maintenance scenario by the sub-device under which the reliability of the power equipment becomes equal to or higher than preset reliability.

Besides, the step of updating the reliability model for the power equipment while updating the unique reliability model by the each sub-device by a predetermined priority and according to execution of maintenance may include a step of selecting a maintenance scenario by the sub-device under which the reliability of the power equipment becomes equal to or higher than preset reliability.

Moreover, the step of updating the reliability model for the power equipment while updating the unique reliability model by the each sub-device by a predetermined priority and according to execution of maintenance may include a step of selecting a total maintenance cost to be equal to or less than a specified amount upon the selection of the maintenance scenario by the sub-device of the power equipment.

Effects of the Invention

The present invention has an advantage of being capable of deriving an optimal reliability model by compensating a reference reliability model for power equipment while deriving an optimal reliability model by sub-device of power equipment during a pre-created process of compensating the reference reliability model thereby.

Besides, the present invention has an advantage of satisfying needs of customers for a request of a replacement cycle, a maintenance plan, and an asset management technique of the power equipment and its sub-devices.

DETAILED DESCRIPTION OF THE PREFERRED EMBODIMENTS

Detailed example embodiments to implement the present invention will be explained below by referring to attached drawings.

Advantages and/or characteristics of the present invention and a method for achieving them will be clarified by referring to example embodiments described in details with attached drawings. However, the present invention will not be limited to example embodiments below but will be implemented in a variety of forms. The example embodiments herein will complete the commencement of the present invention and will be provided to completely inform those skilled in the art of the scope of the present invention in the technical field to which the present invention belongs and the present invention is just defined by the scope of claims. Same reference signs indicate same components over the whole specification.

Figure 1:
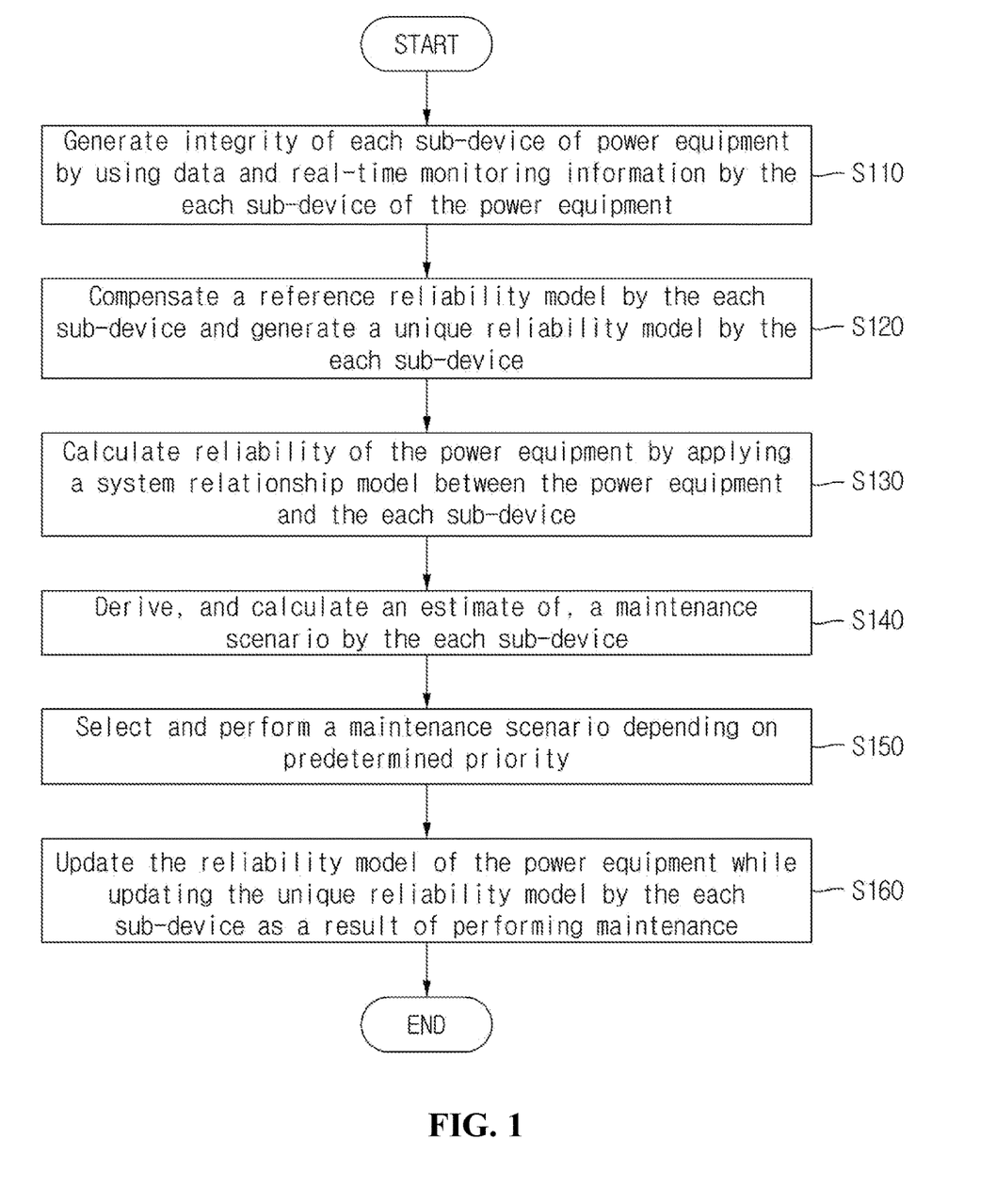
FIG. 1 is a flowchart to explain an asset management method for power equipment in accordance with one example embodiment of the present invention.

FIG. 1 is a flowchart to explain an asset management method for power equipment in accordance with one example embodiment of the present invention.

By referring to FIG. 1, an asset management apparatus 100 for power equipment first generates integrity by sub-device by using state data and the real-time monitoring data by sub-device of power equipment at S110. At the time, the state data and the real-time monitoring data by sub-device of power equipment includes online, offline, and remote monitoring data by sub-device. The offline monitoring state data include at least one of data on installation history, checkup history, failure history, operating environment, and operating history by sub-device.

In accordance with one example embodiment of S110, the asset management apparatus 100 for power equipment may generate total score of, and actions against, technical risks depending on an operating environment, insulation deterioration, an electrical risk, a thermal risk, a chemical risk, a mechanical risk, airtightness performance, insulation performance, interrupting performance, and current-carrying performance by the each sub-device.

For example, the asset management apparatus 100 for power equipment may generate total score of, and actions against, technical risks depending on an operating environment, insulation deterioration, an electrical risk, a thermal risk, a chemical risk, and a mechanical risk of a transformer, TR, by using information on a reference reliability model of the TR.

For another example, the asset management apparatus 100 for power equipment may generate total score of, and actions against, technical risks depending on operating history data, airtightness performance, insulation performance, interrupting performance, and current-carrying performance of a gas insulated switchgear or GIS by using a reference reliability model of the GIS.

Next, the asset management apparatus 100 for power equipment compensates a reference reliability model by each sub-device and generates a unique reliability model by the each sub-device by comparing reliability of the reference reliability model by the sub-device and integrity by the sub-device at S120.

Herein, the reference reliability model by sub-device is a reference reliability model by sub-device generated based on data on installation and checkup history, data on analyses of obsolete and removed items, and data on accelerated life tests by sub-device.

At the time, if the integrity by sub-device and the reliability of the reference reliability model thereby are identical to each other, the asset management apparatus 100 for power equipment does not compensate the reference reliability model by sub-device by determining that the currently used reference reliability model by sub-device is an optimal reference reliability model.

In addition, if the integrity by sub-device and the reliability of the reference reliability model thereby are different from each other, the asset management apparatus 100 for power equipment generates a unique reliability model by sub-device by compensating the reference reliability model by sub-device.

In other words, if the integrity by sub-device and the reliability of the reference reliability model thereby are different from each other, the asset management apparatus 100 for power equipment determines that the currently used reference reliability model by sub-device is not an optimal reliability model, compensates the reference reliability model by sub-device by using the integrity by sub-device and then calculates a unique reliability model by sub-device.

Through the aforementioned process, the asset management apparatus 100 for power equipment may optimize the reliability model of the power equipment by compensating the reference reliability model by sub-device by the integrity thereby, instead of continuously using the reference reliability model thereby.

Next, the asset management apparatus 100 for power equipment calculates reliability of the power equipment by applying a system relationship model between the power equipment and each of its sub-devices to which specific weight and failure rate are reflected at S130.

In accordance with one example embodiment, the asset management apparatus 100 for power equipment calculates the failure rates of all sub-devices by applying conditional probability and a failure rate of each of the sub-devices and failure rate of the power equipment to all the sub-devices by summing up the failure rates of all the sub-devices. This may be explained under an equation 1 below.

$$\lambda_{assembled} = \sum_{i=1}^{n} P_i \lambda_i \quad \text{[Equation 1]}$$

$\lambda_{assembled}$: Failure rate of power equipment to all of its sub-devices
$P_i$: Conditional probability by sub-device
$\lambda_i$: Failure rate by sub-device
i: Variable indicating each sub-device In accordance with another example embodiment, the asset management apparatus 100 for power equipment calculates failure rates of all sub-devices by applying weight and failure rate to each of the sub-devices and calculate the failure rate of power equipment to all its sub-devices by summing up the failure rates of all the sub-devices. This may be explained under an equation 2 below.

$$\lambda_{assembled} = \sum_{i=1}^{n} \omega_i \lambda_i \quad \text{[Equation 2]}$$

$\lambda_{assembled}$: Failure rate of power equipment to all of its sub-devices
$\omega_i$: Weight by sub-device
$\lambda_i$: Failure rate by sub-device
i: Variable indicating each sub-device The above example embodiment explains a method for calculating the failure rate of the power equipment to all the sub-devices by summing up the failure rates of all the sub-devices, but the present invention is not limited to this and a variety of methods may be applied depending on different situations.

Next, the asset management apparatus 100 for power equipment derives, and calculates an estimate of, a maintenance scenario by sub-device at S140.

In accordance with one example embodiment of S140, the asset management apparatus 100 for power equipment may derive, and calculate an estimate of, a maintenance scenario by sub-device, including a maintenance strategy method, costs, and priority by the each sub-device, checkup cycle, estimated costs, checkup scheduling, and assumed maintenance effects thereby, and expected replacement time thereby, depending on an output value for assessing reliability, an output value for technical assessment, and an output value for economic feasibility by the maintenance scenario.

In addition, the asset management apparatus 100 for power equipment selects and executes a maintenance scenario by a predetermined priority at S150. At the time, the predetermined priority which selects the maintenance scenario may be allowed to increase reliability of the power equipment equal to or higher than preset reliability or reduce a total maintenance amount equal to or less than a specified amount and a variety of priorities may be applied depending on different situations.

Lastly, the asset management apparatus 100 for power equipment updates the reliability model for the power equipment while updating the unique reliability model by sub-device based on the result of executing the maintenance at S160.

Figure 2:
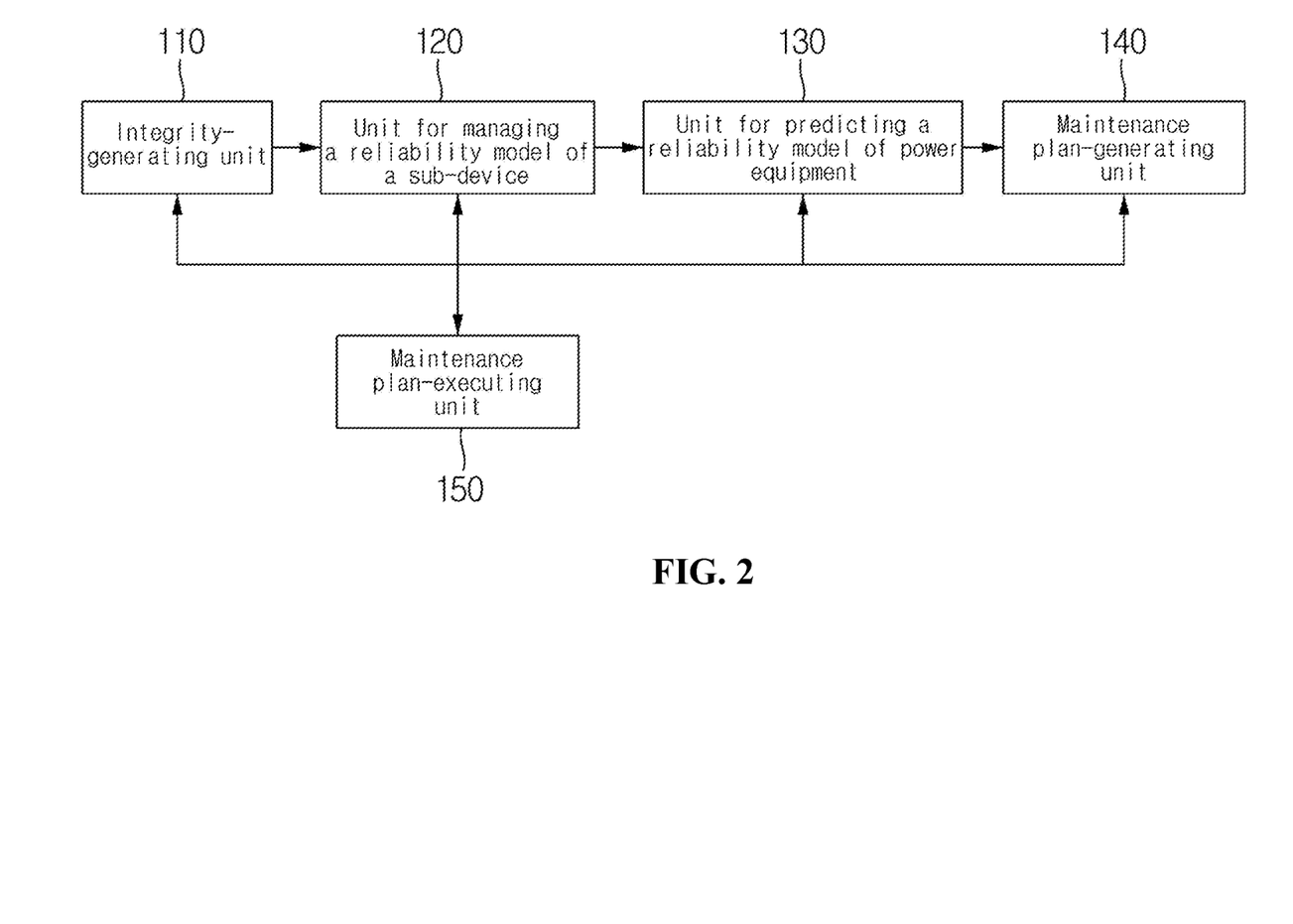
FIG. 2 is a block diagram to explain an internal structure of the asset management apparatus for power equipment in accordance with one example embodiment of the present invention.

FIG. 2 is a block diagram to explain an internal structure of the asset management apparatus for power equipment in accordance with one example embodiment of the present invention.

By referring to FIG. 2, the asset management apparatus 100 for power equipment includes an integrity-generating unit 110, a unit 120 for managing a reliability model of a sub-device, a unit 130 for predicting a reliability model of power equipment, a maintenance plan-generating unit 140, and the maintenance plan-executing unit 150.

The integrity-generating unit 110 generates integrity by each sub-device of power equipment by using the state data and the real-time monitoring data by sub-device. At the time, the state data and the real-time monitoring data by each sub-device of power equipment include online, and offline monitoring state data and remote monitoring data by each sub-device. The offline monitoring state data may include at least one of data on installation and checkup history, data on analyses of obsolete and removed items, and data on accelerated life tests by sub-device.

In accordance with the present invention, the integrity-generating unit 110 may generate total score of, and actions against, technical risks depending on an operating environment, insulation deterioration, an electrical risk, a thermal risk, a chemical risk, a mechanical risk, airtightness performance, insulation performance, interrupting performance, and current-carrying performance by sub-device.

For an example, the integrity-generating unit 110 may generate total score of, and actions against, technical risks depending on an operating environment, insulation deterioration, an electrical risk, a thermal risk, a chemical risk, and a mechanical risk of a transformer, TR, by using information on a reference reliability model of the TR.

For another example, the integrity-generating unit 110 may generate total score of, and actions against, technical risks depending on operating history data, airtightness performance, insulation performance, interrupting performance, and current-carrying performance of a gas insulated switchgear or GIS by using a reference reliability model of the GIS.

The unit 120 for managing a reliability model of a sub-device determines whether to compensate the reference reliability model by each sub-device by comparing the reference reliability model by the each sub-device with integrity thereby generated by the integrity-generating unit 110. Herein, the reference reliability model by each sub-device may be generated based on data on installation and checkup history, data on analyses of obsolete and removed items, and data on accelerated life tests by each sub-device, etc.

At the time, if the integrity by each sub-device and the reliability of the reference reliability model thereby are identical to each other, the unit 120 for managing a reliability model of a sub-device does not compensate the reference reliability model by the each sub-device by determining that the currently used reference reliability model by the each sub-device is an optimal reference reliability model.

In addition, if the integrity by each sub-device and the reliability of the reference reliability model thereby are different from each other, the unit 120 for managing a reliability model of a sub-device generates a unique reliability model by the each sub-device by compensating the reference reliability model thereby.

In other words, if the integrity by each sub-device and the reliability of the reference reliability model thereby are different from each other, the unit 120 for managing a reliability model of a sub-device determines that the currently used reference reliability model by the each sub-device is not an optimal reliability model, compensates the reference reliability model by the each sub-device by using the integrity thereby and then calculates a unique reliability model thereby.

The aforementioned process may allow the reliability model of the power equipment to be optimized by compensating the reference reliability model by each sub-device depending on the integrity thereby, instead of continuously using the reference reliability model by the each sub-device.

The unit 130 for predicting a reliability model of power equipment calculates the reliability of the power equipment by applying a system relationship model between the power equipment and the each sub-device to which specific weight and failure rate are reflected.

In accordance with one example embodiment, the unit 130 for predicting a reliability model of power equipment calculates reliabilities of all sub-devices by using reliability by the each sub-device and then the reliability of the power equipment based thereon.

For an example, the unit 130 for predicting a reliability model of power equipment may calculate the failure rates of all sub-devices by applying conditional probability and a failure rate to each sub-device as shown in Equation 1 above and then the failure rate of the power equipment to all the sub-devices by summing up the failure rates of all the sub-devices.

For another example, the unit 130 for predicting a reliability model of power equipment may calculate the failure rates of all sub-devices by applying weight and failure rate to each sub-device as shown in Equation 2 above and then the failure rate of the power equipment to all the sub-devices by summing up the failure rates of all the sub-devices.

Meanwhile, the maintenance plan-generating unit 140 derives, and calculates an estimate of, a maintenance scenario by each sub-device.

In accordance with one example embodiment, the maintenance plan-generating unit 140 may derive, and calculate an estimate of, a maintenance scenario by each sub-device including a maintenance strategy method, costs, and a priority by each sub-device, checkup cycle, estimated costs, checkup scheduling, and assumed maintenance effects thereby, and expected replacement time thereby depending on an output value for assessing reliability, an output value for technical assessment, and an output value for economic feasibility by the maintenance scenario.

The maintenance plan-executing unit 150 may allow a maintenance scenario to be selected in a predetermined priority for the maintenance scenario and the estimate by sub-device generated by the maintenance plan-generating unit 140 and allow maintenance to be executed. At the time, as explained above, the predetermined priority which selects the maintenance scenario may be allowed to increase reliability of the power equipment equal to or higher than preset reliability or reduce a total maintenance amount equal to or less than a specified amount and a variety of priorities may be applied depending on different situations.

Figure 3:
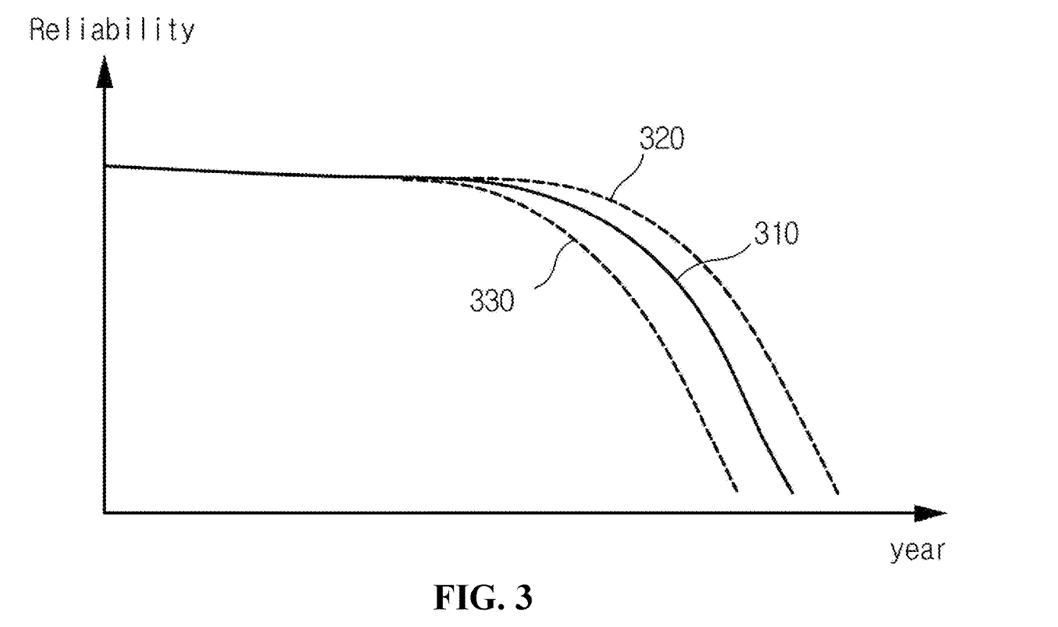
FIG. 3 is a graph to explain a process of determining whether to compensate a reference reliability model by sub-device in accordance with one example embodiment of the present invention

FIG. 3 is a graph to explain a process of determining whether to compensate a reference reliability model by each sub-device in accordance with one example embodiment of the present invention.

By referring to FIG. 3, the asset management apparatus 100 for power equipment determines whether to compensate the reference reliability model by each sub-device by comparing reliability 310 of a reference reliability model by each sub-device with reliability 320, 330 by generated integrity by the each sub-device. At the time, as stated above, the reference reliability model by the each sub-device may be generated based on data on installation and checkup history, data on analyses of obsolete and removed items, and data on accelerated life tests by sub-device.

Herein, a drawing reference number 320 represents that reliability depending on integrity by sub-device is a state higher than reliability 310 of a reference reliability model by each sub-device while a drawing reference number 330 represents that reliability depending on integrity by sub-device is a state lower than reliability 310 of a reference reliability model by each sub-device.

In accordance with one example embodiment, if the reliability 310 of the reference reliability model by the each sub-device is different from the reliability 320, 330 depending on the integrity thereby generated based on the state data and the real time monitoring data by the each sub-device, the asset management apparatus 100 for power equipment calculates a unique reliability model by each sub-device by compensating the reference reliability model by the each sub-device.

In other words, if the reliability 320, 330 depending on the integrity by the each sub-device is different from the reliability 310 of the reference reliability model thereby, the asset management apparatus 100 for power equipment determines that the currently used reference reliability model by sub-device is not an optimal reference reliability model, compensates the reference reliability model by using the integrity by the each sub-device, and then calculates the unique reliability model by the each sub-device.

In accordance with the present invention, it would be possible to derive an optimal reliability model by each sub-device by compensating the reference reliability model by the each sub-device through the aforementioned process.

Figure 4:
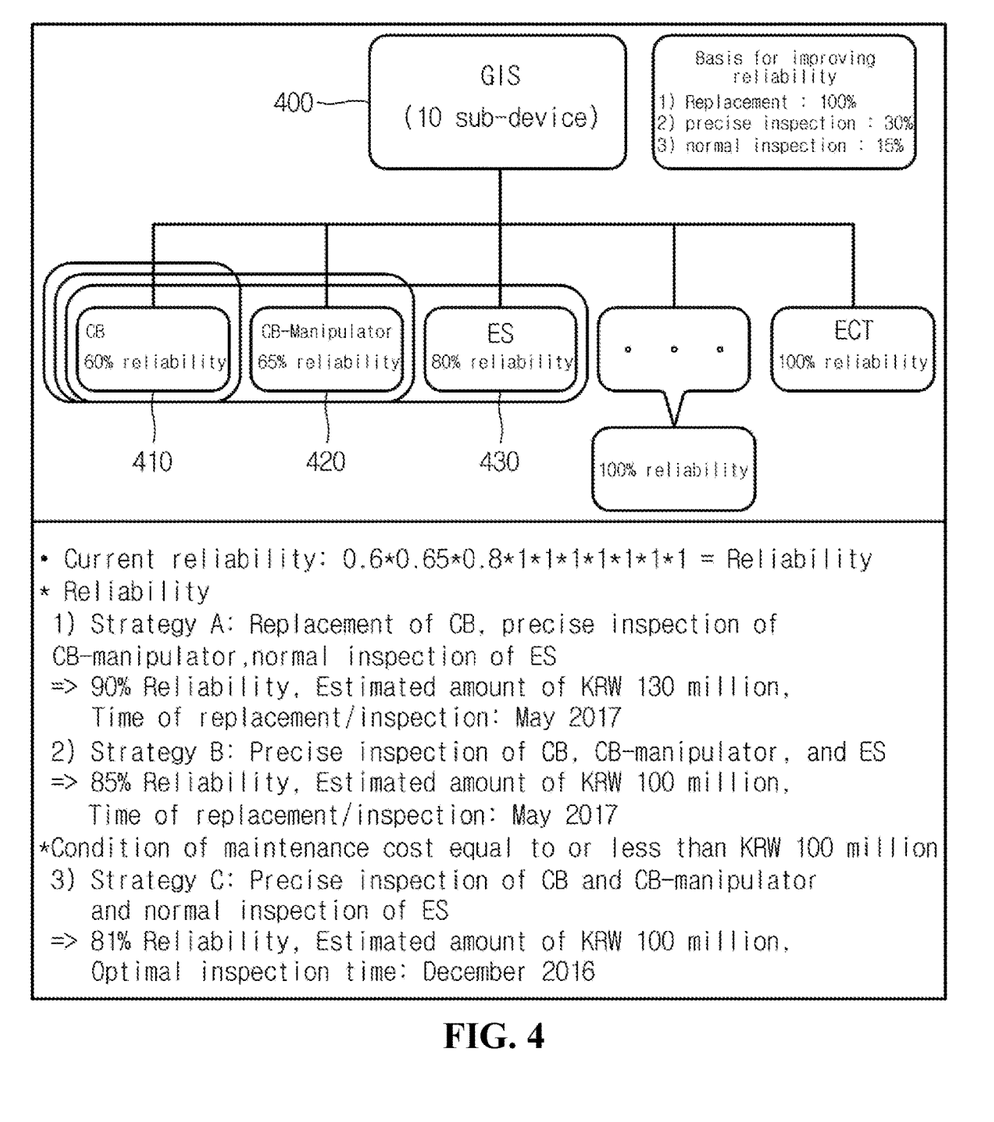
FIG. 4 is an exemplary diagram to explain a process of selecting a maintenance scenario by sub-device in details in accordance with one example embodiment of the present invention.

FIG. 4 is an exemplary diagram to explain a process of selecting a maintenance scenario by sub-device in details in accordance with one example embodiment of the present invention.

Below is an explanation on a process for selecting a maintenance scenario with a GIS, as an example in accordance with the present invention.

By referring to FIG. 4, the GIS 400 comprises 10 sub-devices. For example, sub-devices include a circuit breaker or CB 410 with 60% reliability, a CB manipulator 420 with 65% reliability, an ES 430 with 80% reliability, and seven other sub-devices with 100% reliability.

The asset management apparatus 100 for power equipment draws reliability of the GIS 400 by applying reliability by each sub-device to a system relationship model between the power equipment and sub-devices. To do this, the asset management apparatus 100 for power equipment calculates the reliability of all the sub-devices and decides the reliability of the power equipment by using the reliability by the each sub-device.

In other words, the asset management apparatus 100 for power equipment may calculate reliability of all sub-devices by multiplying reliability of each sub-device as 0.6×0.65×0.8×1×1×1×1×1×1×1=38% on assumption that 0.6 for the CB 410, 0.65 for the CB manipulator 420, 0.8 for the ES 430 and 1 for seven sub-devices (1×7) as reliability. Through this, the reliability of the power equipment may be determined to be 38%. Herein, the reliability of each sub-device has been multiplied but the present invention is not limited to this and as explained above, the reliability of all the sub-devices may be also calculated in a method of summing up the reliability of the each sub-device.

Besides, the asset management apparatus 100 for power equipment may derive a maintenance scenario by each sub-device and may derive maintenance strategies A to C as examples.

Figure 5:
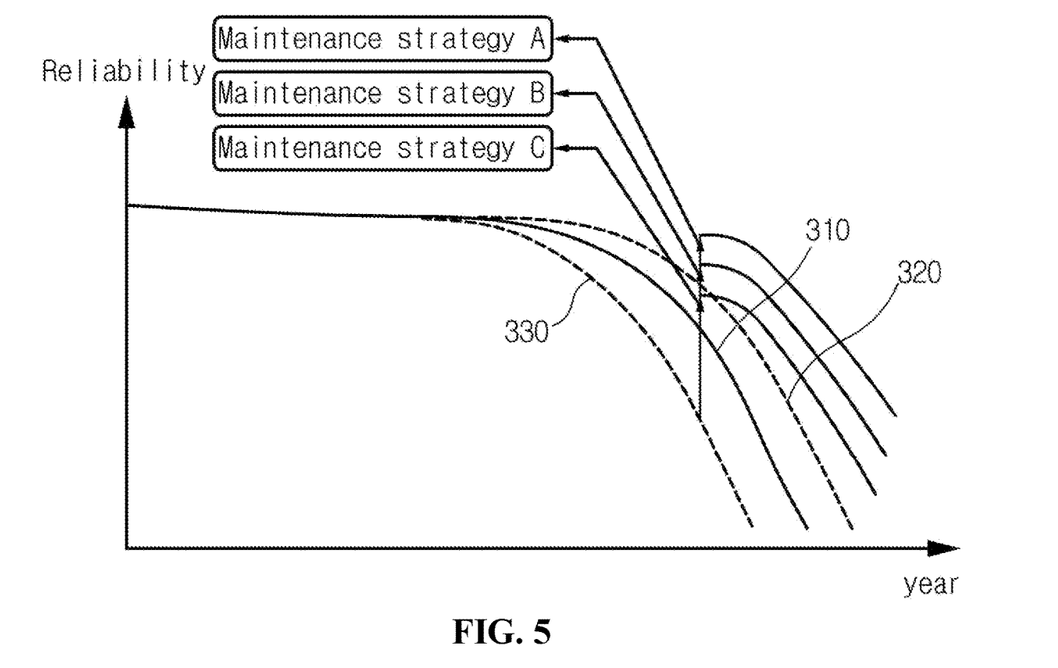
FIG. 5 is a graph to explain reliability change by each maintenance scenario by sub-device in accordance with one example embodiment of the present invention.

The maintenance methods applied at the time may include replacement of a device, precise inspection, normal inspection and so forth. Through each maintenance method, a basis of improving reliability may be set as 100% for replacement of a device, 30% for precise inspection, and 15% for normal inspection and it is possible to derive a value of improving failure rates depending on the improved reliability. This is illustrated in FIG. 5. FIG. 5 is a graph to explain change in reliability by each maintenance scenario by each sub-device in accordance with one example embodiment of the present invention and the detailed explanation is made below. At the time, the basis of improving the reliability may be changed according to the maintenance of precise inspection and normal inspection depending on the history of actual maintenance carried out.

The maintenance strategy A is a strategy of increasing 0.95×0.95×1×1×1×1×1×1×1×1=90% as reliability of the power equipment based on 100% reliability of the CB 410 through replacement of the CB 410, 95% reliability of the CB manipulator 420 through precise inspection, and 95% reliability of the ES 430 through normal inspection.

The maintenance strategy B is a strategy of increasing 0.95×0.9×0.95×1×1×1×1×1×1×1=85% as reliability of the power equipment based on 90% reliability of the CB 410 through precise inspection, 95% reliability of the CB manipulator 420 through precise inspection, and 100% reliability of the ES 430 through precise inspection.

Meanwhile, the maintenance strategy C is a strategy of increasing 0.9×0.95×0.95×1×1×1×1×1×1×1=81% as reliability of the power equipment based on 90% reliability of the CB 410 through its precise inspection, 95% reliability of the CB manipulator 420 through its precise inspection, and 95% reliability of the ES 430 through its precise inspection.

Since then, the asset management apparatus 100 for power equipment selects a maintenance scenario by a predetermined priority. As explained above, the predetermined priority applied at the time may be set to increase reliability of power equipment equal to or higher than preset reliability or to make a total maintenance cost be equal to or less than a specified amount and a variety of priorities may be applied depending on different situations.

FIG. 5 is a graph to explain reliability change by a maintenance scenario by each sub-device in accordance with one example embodiment of the present invention.

In accordance with one example embodiment, the basis of improving reliability may be set differently depending on each maintenance method. A maintenance method may be set to be 100% for replacement of a device, 30% for precise inspection, and 15% for normal inspection but reliability by maintenance each through precise inspection and through normal inspection may be changed depending on the history of actual maintenance carried out.

In FIG. 5, it can be found out that the maintenance strategy A determined through a process of FIG. 4, as a maintenance scenario including replacement of the device, has the most greatly improved reliability while the maintenance strategy B, as a precise inspection-centered maintenance scenario, has the moderately improved reliability.

Meanwhile, it can be found out that the maintenance strategy C determined through a process of FIG. 4, a maintenance scenario to which normal inspection is applied, shows the least greatly improved reliability.

Figure 6:
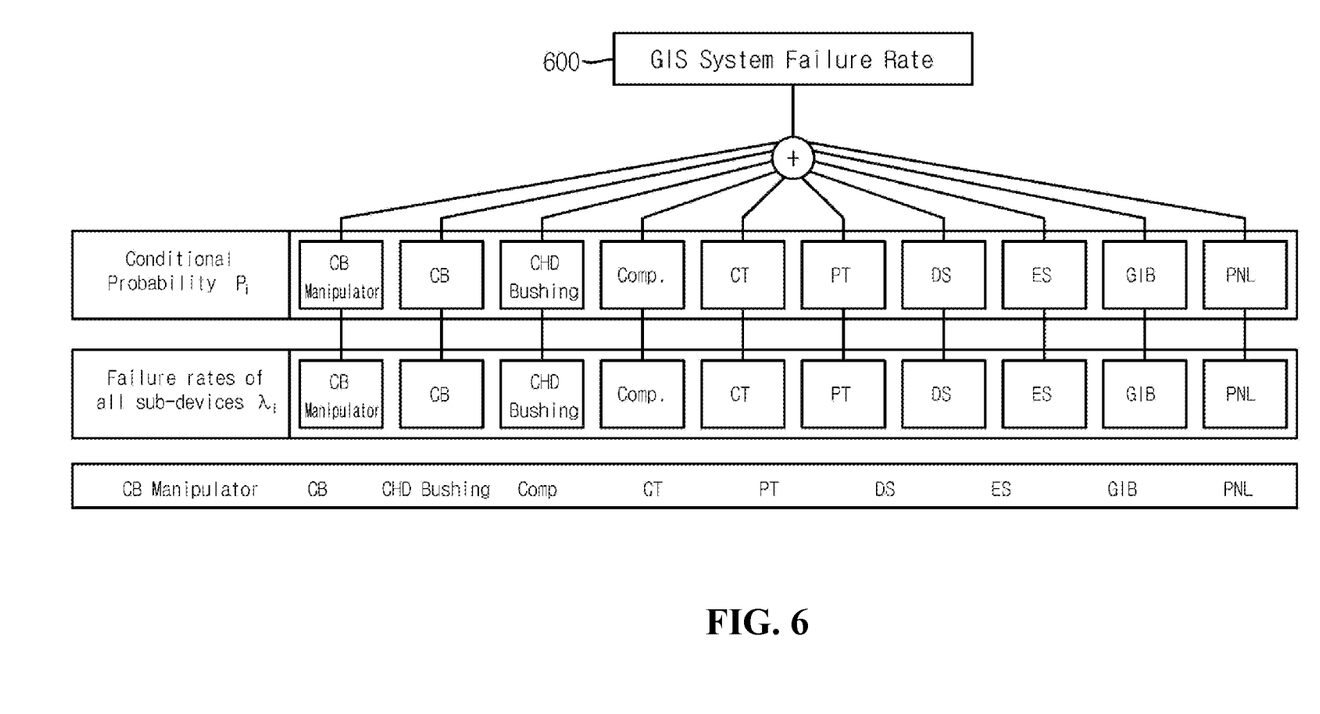
FIGS. 6 and 7 are exemplary diagrams to explain a process of calculating reliability of power equipment by using the reliability by sub-device in accordance with one example embodiment of the present invention.
Figure 7:
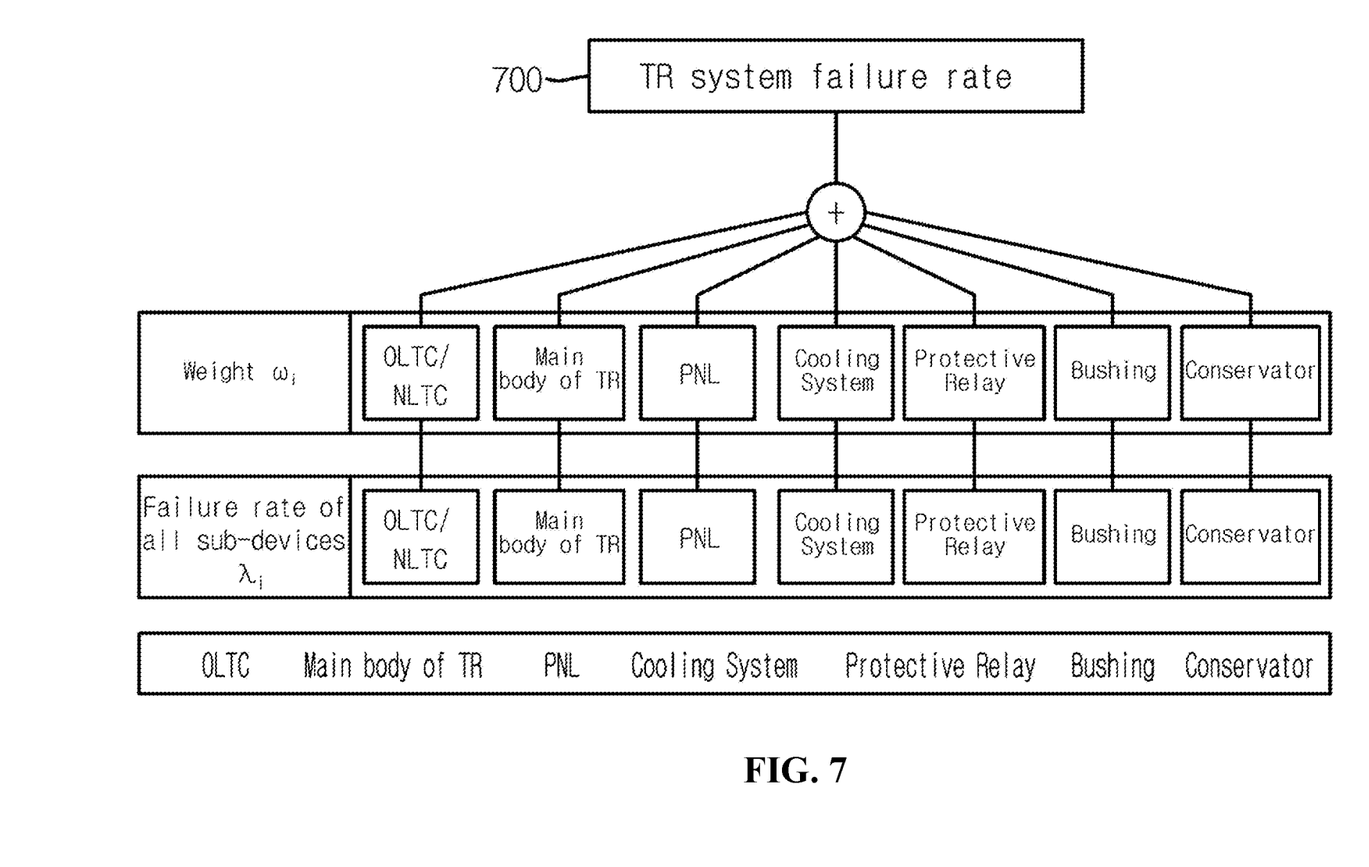

FIGS. 6 and 7 are exemplary diagrams to explain a process of calculating reliability of power equipment by using a failure rate by each sub-device in accordance with one example embodiment of the present invention.

By referring to FIGS. 6 and 7, the asset management apparatus 100 for power equipment derives the failure rate of the power equipment by applying the failure rate by the each sub-device to the system relationship model between the power equipment and its sub-devices.

In accordance with one example embodiment, the asset management apparatus 100 for power equipment may calculate the failure rates of all sub-devices by applying conditional probability P and a failure rate $\lambda$ to each sub-device to determine the reliability of the power equipment to all the sub-devices.

For example, as shown in FIG. 6, the asset management apparatus 100 for power equipment may calculate the failure rates of all sub-devices by applying conditional provability P and failure rate $\lambda$ to sub-devices, i.e., a CB manipulator, a CB, CHD bushing, Comp., CT, PT, DS, ES, GIB, and PNL of a gas insulated switchgear or GIS 600 to determine reliability of the GIS 600 to all the sub-devices.

In accordance with another example embodiment, the asset management apparatus 100 for power equipment may calculate the failure rates of all the sub-devices by applying weight w and failure rate $\lambda$ to each sub-device to determine reliability of the power equipment to all the sub-devices.

For example, as shown in FIG. 7, the asset management apparatus 100 for power equipment may calculate the failure rate of all the sub-devices by applying weight w and failure rate $\lambda$ to all sub-devices of a transformer 700, including an OLTC, an NLTC, a main body of the TR, a PNL, a cooling system, a protective relay, bushing and a conservator, to determine reliability of the power equipment to all the sub-devices.

As shown above, the present invention is explained by limited example embodiments and drawings but it is not limited to the example embodiments. Various changes and modifications may be derived from those skilled in the art. Accordingly, the invention must be identified by the claims of the present invention as described below and all variables and equivalents would appertain to the scope of the ideas of the present invention.

REFERENCE NUMERALS

100: Asset management apparatus for power equipment
110: Integrity-generating unit
120: Unit for managing a reliability model of a sub-device
130: Unit for predicting a reliability model of power equipment
140: Maintenance plan-generating unit
150: Maintenance plan-executing unit

INDUSTRIAL APPLICABILITY

The present invention relates to an asset management method for power equipment and is available in a field of power equipment.

What is claimed is:

1. An asset management method for power equipment, comprising the steps of:
    generating integrity of each sub-device of the power equipment by using state data and real-time monitoring data of the each sub-device;
    compensating a reference reliability model by the each sub-device and generating a unique reliability model by the each sub-device by comparing reliability of the reference reliability model by the each sub-device and the integrity by the each sub-device;
    calculating reliability of the power equipment by applying a system relationship model between the power equipment and the each sub-device to which a specific weight and a failure rate are reflected;
    deriving, and calculating an estimate of, a maintenance scenario by the each sub-device; and
    updating a reliability model for the power equipment while updating the unique reliability model by the each sub-device by a predetermined priority and according to execution of maintenance,
    wherein the reference reliability model by the each sub-device is generated based on at least one of data on an installation history and a checkup history, data on analyses of obsolete and removed items, and data on accelerated life tests by the each sub-device,
    wherein the steps of compensating the reference reliability model and generating the unique reliability model include calculating the reliability by applying the integrity by the each sub-device,
    wherein the step of calculating the reliability of the power equipment by applying the system relationship model includes calculating a failure rate of the power equipment by applying the specific weight and the specific failure rate to the each sub-device,
    wherein the step of updating the reliability model includes selecting a maintenance scenario by the each sub-device under which the reliability of the power equipment becomes equal to or higher than a preset reliability,
    wherein the preset reliability is set differently depending on a basis of improving reliability, and
    wherein the basis of improving reliability is set differently for a replacement of a sub-device, for precise inspection, and for normal inspection.

2. The method of claim 1, wherein the step of generating the integrity of each sub-device of the power equipment includes generating the integrity by the each sub-device by utilizing online, and offline monitoring state data and remote monitoring data by the each sub-device, and wherein the offline monitoring state data include at least one of data on the installation history, the checkup history, failure history, operating environment, and operating history by the each sub-device.

3. The method of claim 1, wherein the step of generating the integrity of each sub-device includes generating a total score of, and actions against, technical risks depending on an operating environment, insulation deterioration, an electrical risk, a thermal risk, a chemical risk, a mechanical risk, airtightness performance, insulation performance, interrupting performance, and current-carrying performance by the each sub-device.

4. The method of claim 1, wherein the estimate of the maintenance scenario by the each sub-device is calculated by using a maintenance strategy method, costs, and priority by the each sub-device, a checkup cycle, checkup scheduling, and assumed maintenance effects thereby, and expected replacement time thereby, an output value for assessing reliability, an output value for technical assessment, and an output value for economic feasibility by the maintenance scenario.

5. The method of claim 1, wherein the step of updating the reliability model for the power equipment includes selecting a total maintenance cost equal to or less than a specified amount upon selecting the maintenance scenario by the each sub-device of the power equipment.

* * * * *